United States Patent [19]
Newsome

[11] Patent Number: 5,967,503
[45] Date of Patent: Oct. 19, 1999

[54] APPARATUS FOR PROCESSING FOLDED PRINTED PRODUCTS

[76] Inventor: John Robert Newsome, R.R. #1 Box 119, Shumway, Ill. 62461

[21] Appl. No.: 08/943,508

[22] Filed: Oct. 3, 1997

[51] Int. Cl.⁶ .............................. B42B 2/00; B07C 5/12; B65G 47/24; B65G 43/08
[52] U.S. Cl. ..................... 270/52.04; 270/52.26; 209/603; 198/380; 198/401; 198/493; 198/644
[58] Field of Search .................................... 209/600, 601, 209/602, 603, 604, 605; 198/380, 401, 493, 644; 270/52.26, 52.29, 52.04

[56] References Cited

U.S. PATENT DOCUMENTS

Re. 32,410   5/1987   Mayer ........................................ 271/53
3,664,655   5/1972   McCain et al. ............................ 270/56
4,497,480   2/1985   Northdurf ................................... 270/58
4,498,663   2/1985   Wamsley et al. ......................... 270/54
5,114,128   5/1992   Harris, Jr. et al. ......................... 271/11
5,622,268   4/1997   Conner et al. ........................... 209/603
5,673,910   10/1997  Wamsley .................................. 271/259

*Primary Examiner*—William E. Terrell
*Assistant Examiner*—Kenneth Bower
*Attorney, Agent, or Firm*—Alston & Bird LLP

[57] ABSTRACT

A gate for rejecting from a gathering conveyor folded printed products which are found to be defective. The gate includes several mating pairs of ejector rolls positioned to form a nip above the gathering conveyor, and an air ejection system for lifting a defective product into the nip so that the ejector rolls engage the lifted product and convey it to a reject receptacle.

18 Claims, 7 Drawing Sheets

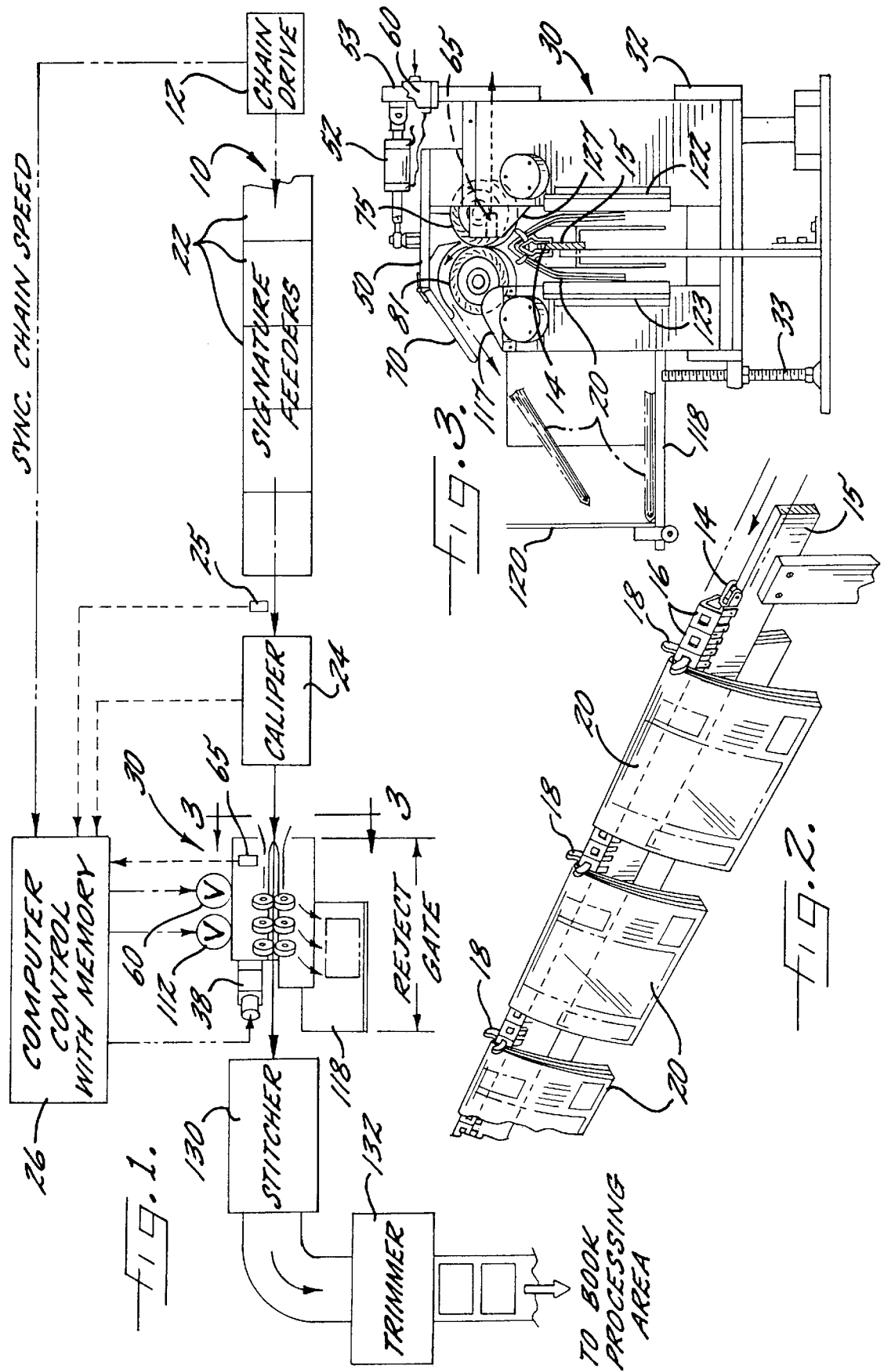

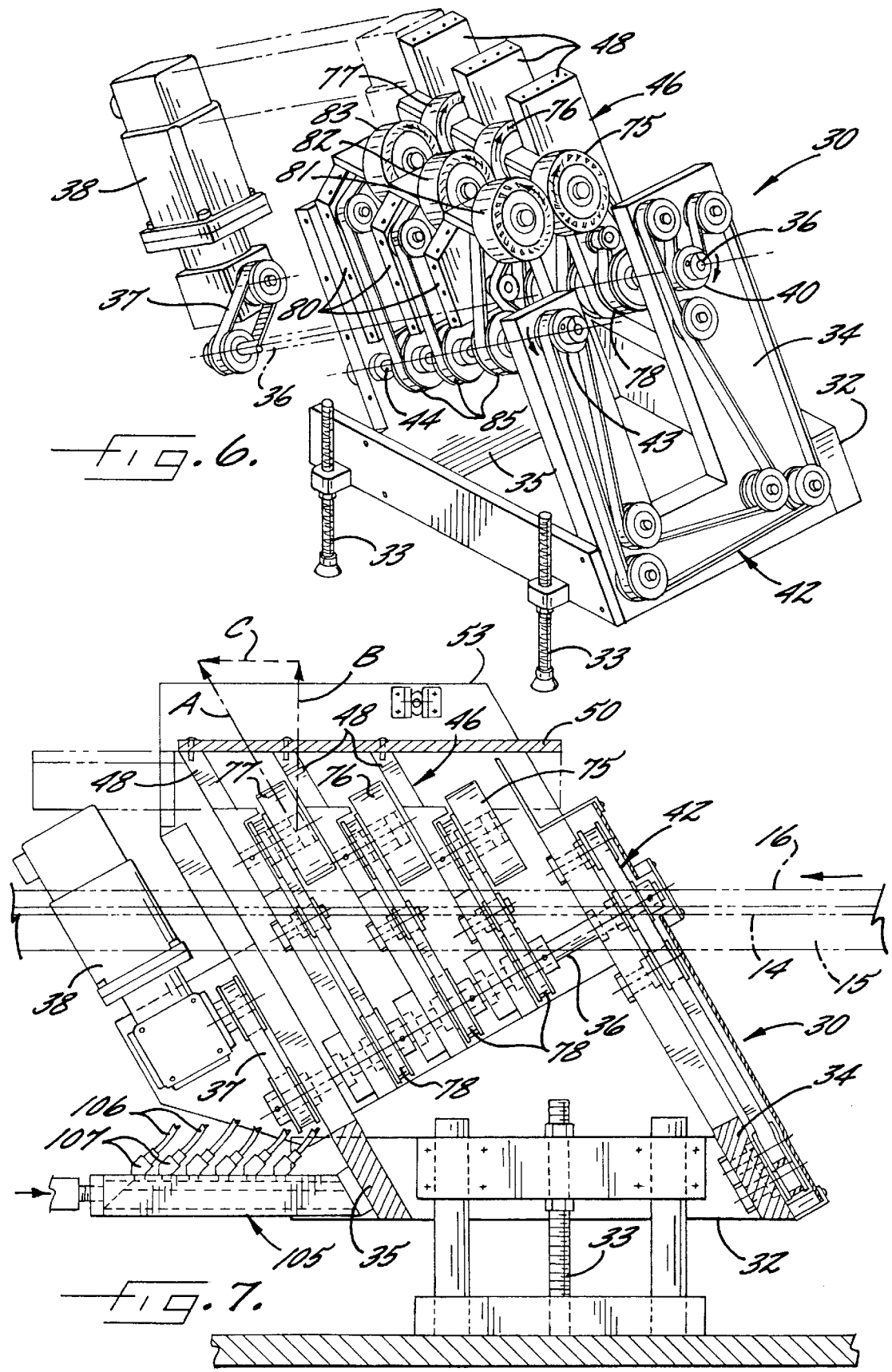

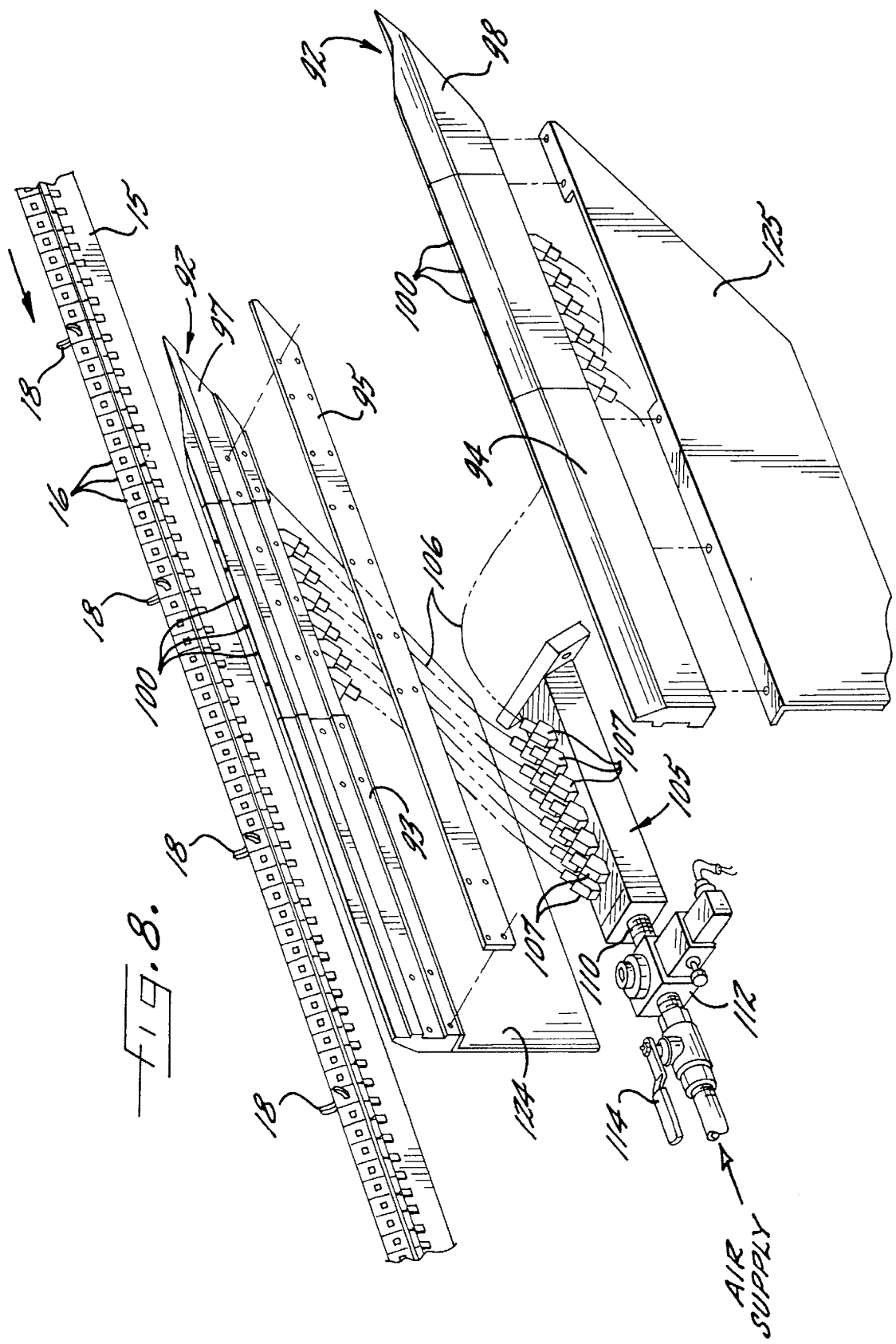

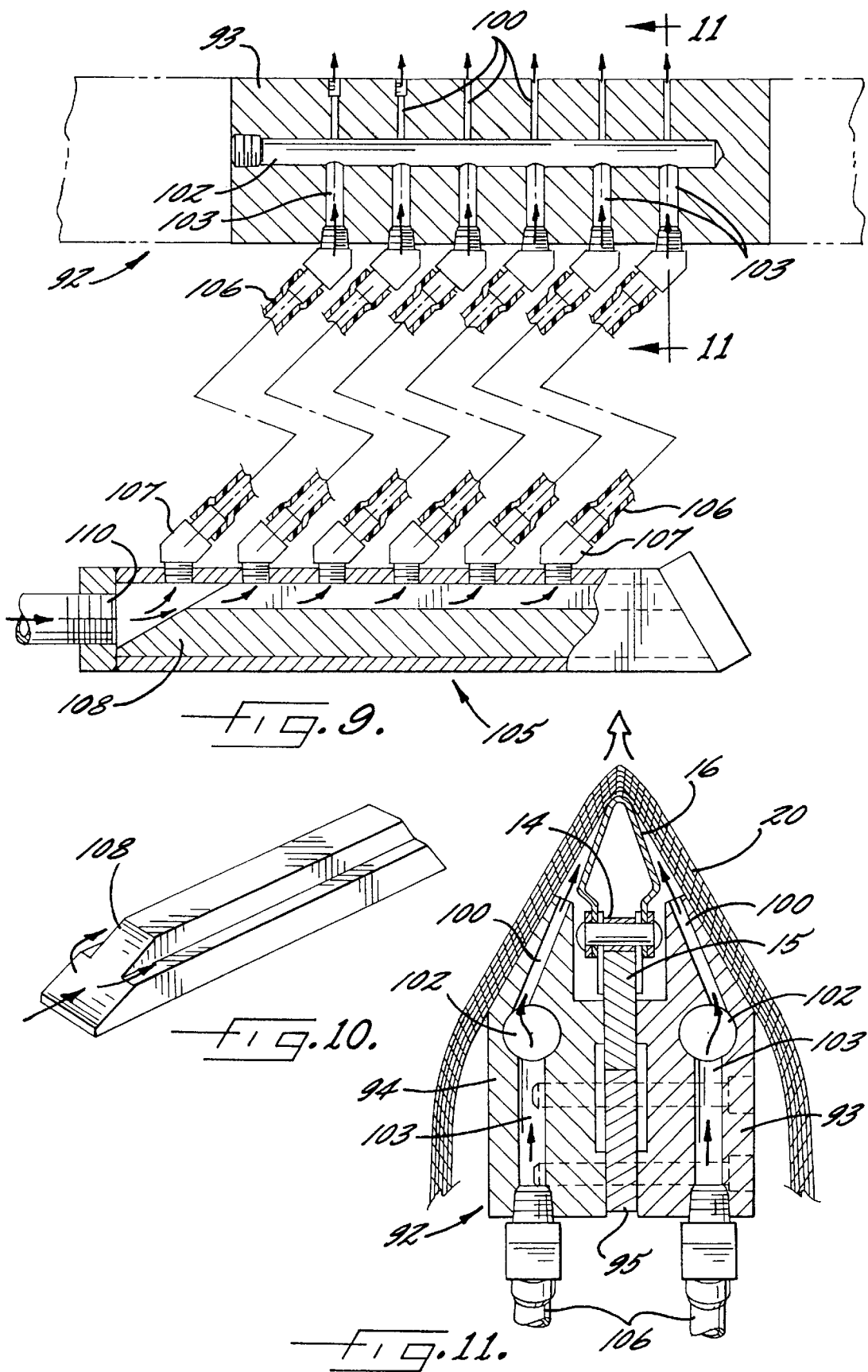

5,967,503

APPARATUS FOR PROCESSING FOLDED PRINTED PRODUCTS

BACKGROUND OF THE INVENTION

The present invention relates to an apparatus for rejecting defective folded printed products from a processing line.

Folded printed products of the type with which the present invention is concerned each comprise a plurality over overlying printed sheets, which are commonly referred to as signatures, and which are assembled into various book forms. The products are serially conveyed in a straddling relation on a gathering conveyor, upon which the individual sheets or signatures are deposited to make up the products, and the conveyor conveys the products through the various assembly operations, which typically include a stitching or binding operation and a trimming operation.

Malfunctions can occur in the delivery of the individual sheets or signatures onto the gathering conveyor, which can result, for example, in a sheet being missing, or in duplicate sheets being delivered, or in a sheet being mis-positioned. Such malfunctions lead to the production of a defective book or magazine, which must then be discarded.

In the prior art, various detectors have been provided which monitor for such malfunctions, with a non-standard product being ejected from the production line. In one known detector, the thickness of each product is measured, and if the measured thickness does not conform to the predetermined standard, the product is removed by a removal device which comprises cammed rollers which physically move into engagement with the defective product and convey it to a reject receptacle. This known removal gate is structurally complex and unreliable in operation.

In another prior reject gate, a blade is utilized to lift a defective product into a nip formed by rollers, which then convey the product to a reject receptacle. The blade must advance and completely retract before the next product arrives on the conveyor, and since such movement involves a relatively significant time period, the production speed of the gathering conveyor is limited.

It is accordingly an object of the present invention to provide an apparatus for ejecting defective products of the described type from a processing line, which is of simplified construction and highly reliable in operation.

It is a further object of the present invention to provide a product rejecting gate of the described type which can be operated at high speed so as to not limit the product speed of the conveyor.

It is also an object of the present invention to provide a product rejecting gate of the described type which is able to remove a defective product without tearing or damaging the product, and so that the product can be easily recycled onto the chain conveyor, thereby avoiding the loss and wastage of the product materials.

SUMMARY OF THE INVENTION

The above and other objects and advantages of the present invention are achieved by the provision of an apparatus for conveying folded printed sheets serially along a path of travel and which comprises an endless product gathering conveyor having an upper run which extends along the path of travel. A drive is provided for advancing the upper run of the conveyor along the path of travel, and feed means is provided for serially feeding folded printed sheets in a straddling relation onto the upper run of the advancing conveyor so as to form a series of advancing printed products each composed of a plurality of the sheets and with the folded printed products being spaced apart along the upper run of the conveyor. At least one product monitor is positioned along the path of travel for monitoring one or more parameters of each printed product as it advances thereby, and for generating a control signal whenever a monitored parameter does not meet a predetermined standard. A product rejecting gate is positioned along the path of travel downstream of the product monitor which comprises at least one mating pair of ejector rolls positioned to form a nip disposed above the upper run of the conveyor, a roll drive for rotating the pair of ejector rolls so that at the nip the rolls move away from the upper run, and an air ejection system for lifting a folded printed product from the upper run of the conveyor and into the nip in response to a control signal from the product monitor indicating that such product does not meet the predetermined standard. The ejector rolls then engage the lifted product and carry the same to a reject receptacle.

The mating pair of ejector rolls is mounted for rotation about respective parallel axes which are each parallel to the upper run of the conveyor when viewed from above the path of travel and inclined with respect to the upper run when viewed from one side of the upper run. Thus at the nip, the rotating rolls have an upward component of movement which is perpendicular to the upper run of the conveyor and a component of movement which is parallel to the direction of movement of the upper run of the conveyor. This orientation of the rolls minimizes the risk that the engagement of the advancing products by the ejector rolls will damage the product, since the forward advance of the product is not significantly interrupted by its engagement with the rolls.

BRIEF DESCRIPTION OF THE DRAWINGS

Some of the objects and advantages of the present invention having been stated, others will appear as the description proceeds, when taken in conjunction with the accompanying drawings, in which FIG. 1 is a schematic view of a production line for processing folded printed products which embodies the present invention;

FIG. 2 is a fragmentary perspective view of the drive chain conveyor of the present invention;

FIG. 3 is a front elevational view of the product rejecting gate of the present invention;

FIG. 6 is a fragmentary perspective view of the internal components of the product rejecting gate;

FIG. 7 is a sectioned side elevation view of the product rejecting gate;

FIG. 8 is an exploded perspective view of the air ejection system of the product rejecting gate;

FIG. 9 is a fragmentary sectioned view of some of the components of the air ejection system;

FIG. 10 is a perspective view of the internal air baffle of the lower manifold box of the air ejection system;

FIG. 11 is a sectional view of the plow assembly of the air ejection system, shown assembled to the guide rail of the drive chain conveyor;

DETAILED DESCRIPTION OF THE PREFERRED EMBODIMENT

Figure 4:
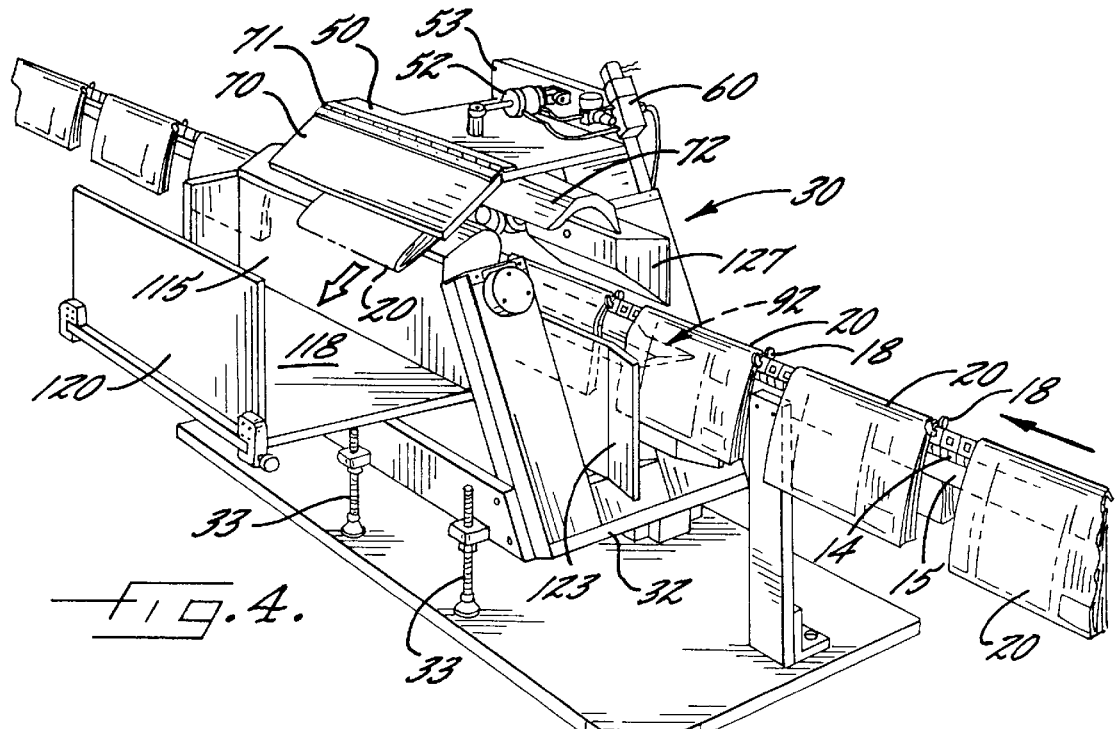
FIG. 4 is a perspective view of the product rejecting gate.
Figure 5:
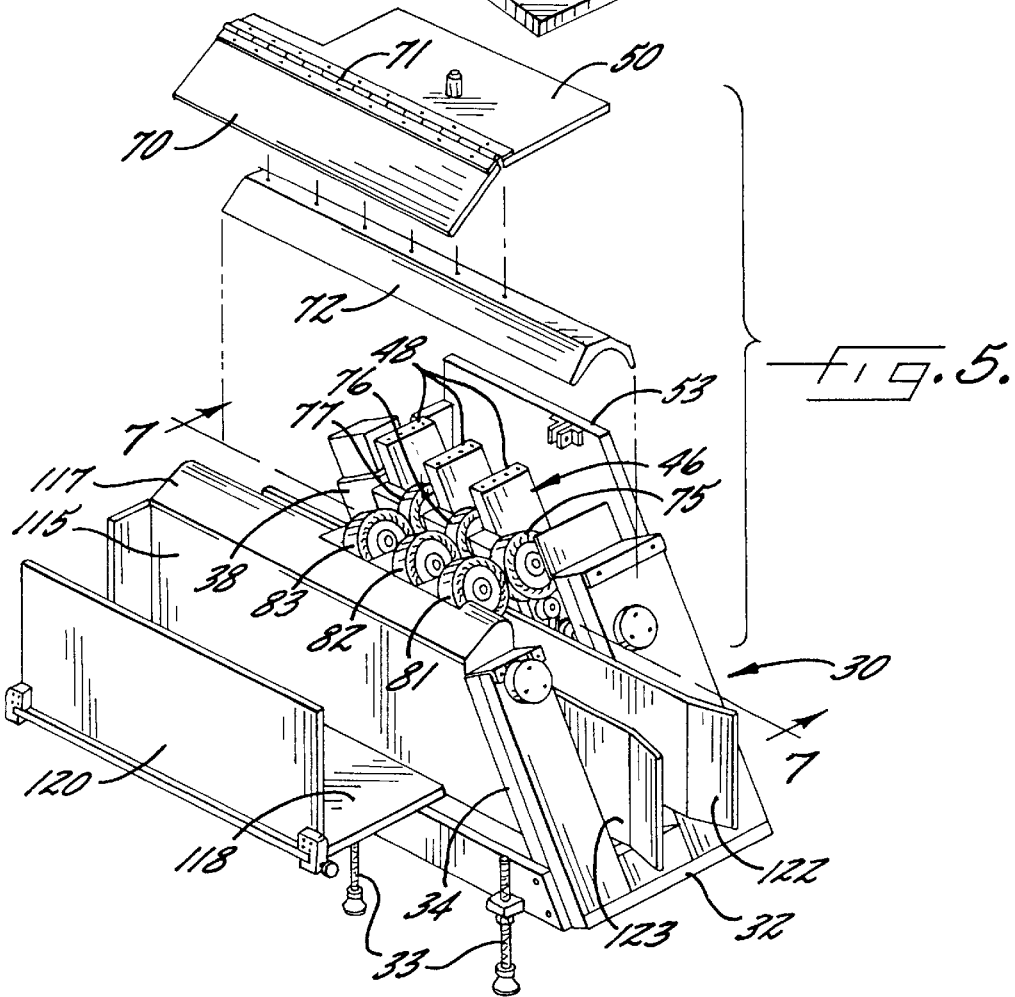
FIG. 5 is an exploded perspective view of the product rejecting gate.

FIG. 1 schematically illustrates a book or magazine production line which embodies the features of the present invention. The line includes a product gathering conveyor 10 which is powered by a chain drive 12 in the conventional manner, and the conveyor includes an endless drive chain 14, the upper run of which is supported upon a fixed guide rail 15, note FIG. 2. The endless drive chain 14 also includes a plurality of receiving saddles 16 of triangular configuration in cross-section, and which are mounted closely adjacent to each other along the chain so as to define inclined side support surfaces which meet at an apex above the chain. Also, a plurality of drive lugs 18 are spaced along the length of the chain for engaging and conveying the products 20 in a spaced apart relation.

A plurality of signature feeders 22 of conventional design are positioned at the upstream end of the gathering conveyor 10, for serially feeding folded printed sheets or signatures onto the upper run of the advancing conveyor, and so as to form the folded printed products 20. The individual sheets, and thus the folded printed products 20, are supported in a straddling relation on the upper run, and so that the products 20 define a fold line which rests on the apex of the saddles 16, and a pair of legs depending from the fold line.

The drive chain conveyor 10, with the gathered products 20, then pass through a caliper 24, which is also of conventional design, for measuring the thickness of each product. One or more detectors 25 may also be positioned upstream or downstream of the caliper for monitoring other parameters of the advancing products, including whether a product is totally missing or mis-positioned on the chain 14. The caliper 24 and the detectors 25 are each designed to emit a control signal which is delivered to a computer control 26, which determines whether each advancing product meets a predetermined standard.

Positioned downstream of the caliper is a product rejecting gate 30 which embodies the novel features of the present invention. More particularly, the product rejecting gate 30 includes a main frame 32 which is supported on the floor by means of several threaded legs 33 which permit the elevation of the gate to be adjusted into alignment with the drive chain conveyor 10. The main frame 32 includes a front panel 34 which is inclined from the vertical as seen in FIG. 7, and a rear panel 35 is similarly positioned at the rear of the gate. Rotatably mounted between the rear and front panels is a primary drive shaft 36 which is connected, via the drive belt transmission 37, to a drive motor 38 as best seen in FIG. 6. The primary drive shaft 36 is inclined at an angle of about 30° from the horizontal, and the forward end of the shaft 36 mounts a pulley 40 which is part of a belt transmission 42 which is mounted on the front panel 34 and which leads to a pulley 43 at the forward end of a secondary drive shaft 44. The secondary drive shaft 44 is parallel to the primary shaft 36 and it is also mounted for rotation between the front and rear panels 34, 35. Thus the primary and secondary drive shafts rotate in unison, but in different directions.

Figure 12:
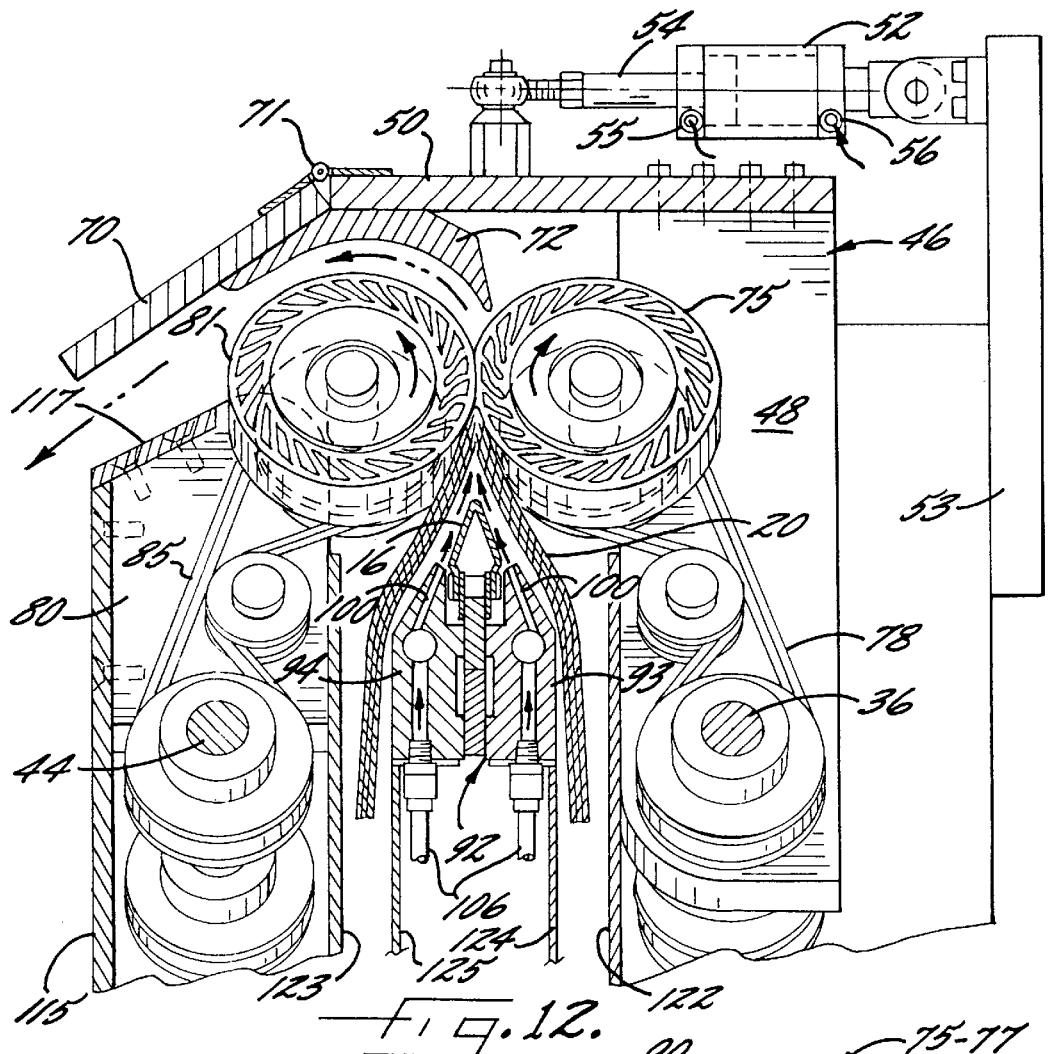
FIG. 12 is a fragmentary sectional view illustrating the operation of the air ejection system and the ejector rolls.
Figure 14:
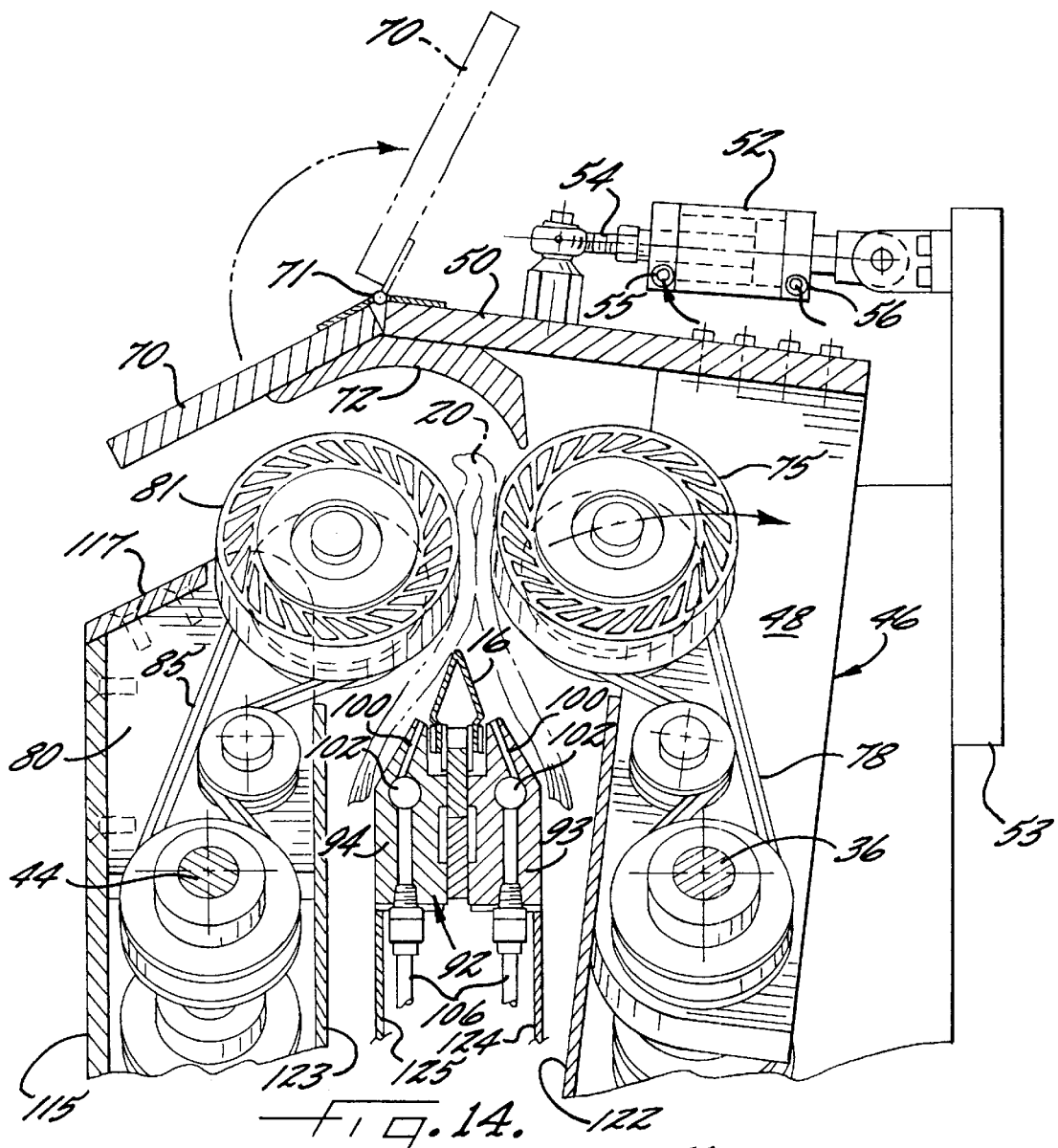
FIG. 14 is a view similar to FIG. 12 but illustrating the opened position of the ejector rolls for withdrawing a jammed product.

The primary drive shaft 36 rotatably supports a frame subassembly 46 which is pivotable about the axis of the primary drive shaft 36 and movable between a closed position as seen in FIG. 12 and an open position as seen in FIG. 14. The frame subassembly 46 includes three upright mounting plates 48 (FIG. 7), with each plate rotatably mounted to the primary drive shaft 36. A top plate 50 overlies and is connected to the three upright mounting plates 48, and a pneumatic drive cylinder 52 is mounted between the top plate 50 and a side frame member 53 which is fixed to the main frame 32. More particularly, the drive cylinder 52 has an output piston shaft 54 which is connected to the top plate 50, and the body of the cylinder is connected to the side frame member. The cylinder also includes air inlet openings 55, 56 at opposite ends of the cylinder, such that upon entry of air into one or the other of the inlet openings, the subassembly may be pivoted between the closed and open positions.

Figure 15:
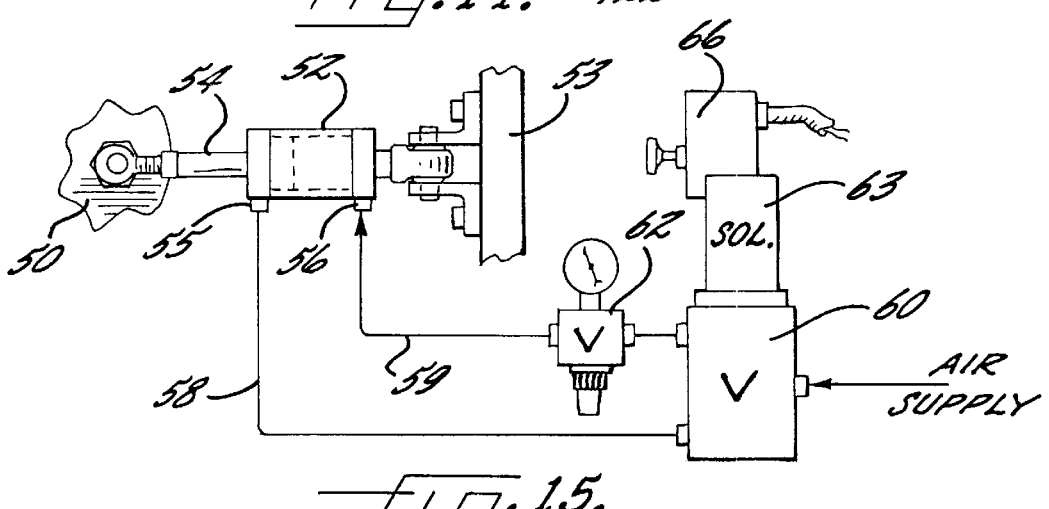
FIG. 15 is a schematic view illustrating the control for opening and closing the ejector rolls.

The pneumatic drive cylinder 52 is controlled as illustrated in FIG. 15, by an air supply system which includes a pair of lines 58, 59 leading to the opposite openings 55, 56 of the cylinder, and a solenoid operated valve 60 for opening one or the other of the lines to an air supply. A regulator valve 62 is positioned in the line 59 which acts to extend the piston shaft 54 and thus close the subassembly 46, such that the pressure acting to close the subassembly can be manually controlled. The solenoid 63 of the valve is operatively controlled by a signal from a jam detector 65 (note FIGS. 1 and 3) located in the gate, and as further described below. Also, a switch 66 is provided to manually operate the solenoid 63, and thus override the control signal from the detector 65.

The top plate pivotally mounts a cover plate 70 by means of a hinge 71, note FIG. 14, and an arcuate guide plate 72 is fixed to the top plate 50 so as to extend along the pivot line of the hinge 71 and limit the downward movement of the cover plate 70 to the position shown in solid lines in FIG. 14.

The three upright mounting plates 48 of the frame subassembly rotatably mount a set of three ejector rolls, with the three ejector rolls 75, 76, 77 mounted for rotation about respective parallel axes. The axes of the ejector rolls 75–77 are parallel to the axis of the primary drive shaft 36, and each ejector roll is rotatably connected to the primary drive shaft by a set of pulleys and an associated timing drive belt 78.

Three additional mounting plates 80 are fixed to the main frame as best seen in FIG. 6, and the three additional mounting plates rotatably mount a set of three ejector rolls 81, 82, 83, with the rolls being mounted for rotation about respective parallel axes which are also parallel to and above the axis of the second drive shaft 44. Each of the ejector rolls 81–83 is rotatably connected to the second drive shaft 44 by a set of pulleys and an associated timing drive belt 85. The rolls of the two sets form three mating pairs of rolls, with each mating pair engaging each other and forming a nip therebetween when the frame subassembly 46 is in the closed position as seen in FIG. 12.

From the above description, it will be seen that each mating pair of ejector rolls is mounted for rotation about respective parallel axes which are each parallel to the upper run of the conveyor 10 when viewed from above the conveyor. Also, the axes are inclined with respect to the upper run when viewed from either side of the conveyor, note FIG. 7. The angle of inclination is about 30°. When rotating, the ejector rolls move at the nip in a direction of movement A (FIG. 7) which has a vertical component B, and a component C which is horizontal and parallel to the direction of movement of the upper run of the conveyor. Preferably, the component C is of approximately the same magnitude as the speed of the upper run, so as to minimize slippage between the rolls and the product 20 during the ejecting operation as further described below.

Figure 13:
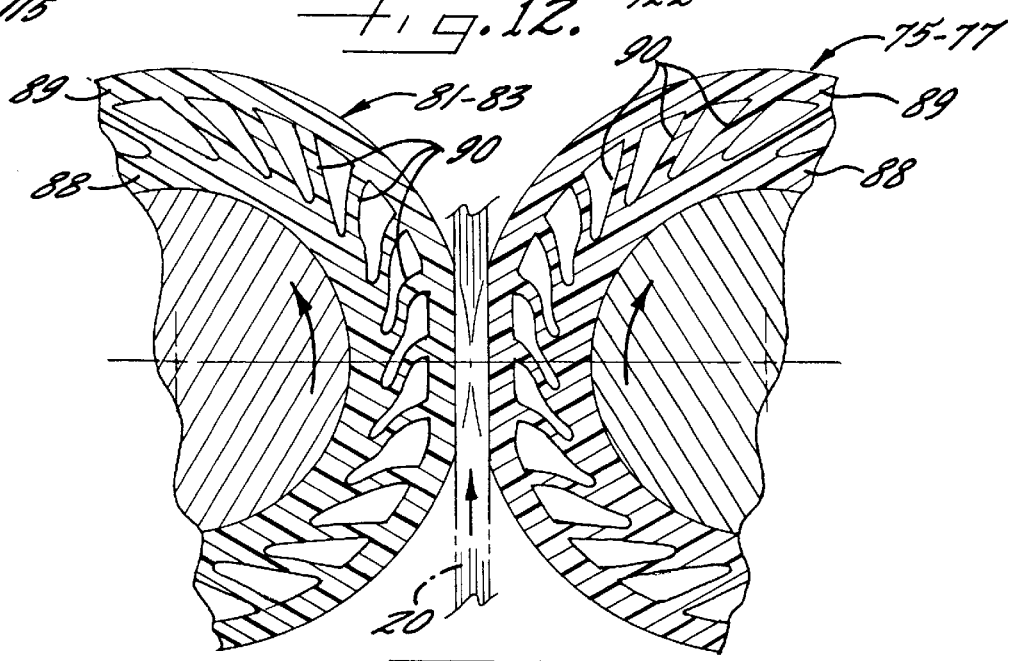
FIG. 13 is a fragmentary sectional view of a pair of mating ejector rolls of the air ejection system shown engaging and removing a folded product.

The ejector rolls are radially resilient, and are of the type commonly called "crush" rolls. More particularly, and as best seen in FIG. 13, the rolls each comprise an outer peripheral plastic segment composed of an inner ring 88, an outer ring 89, and a series of tangentially inclined ribs 90 extending therebetween. This construction permits the outer periphery to be readily deflectable, as is seen in FIG. 13, so as to firmly engage a product 20 without damaging it.

The product rejecting gate further comprises an air ejection system for lifting a selected folded product 20 from the upper run of the drive chain conveyor 10 and into the nip formed by the three aligned mating pairs of ejector rolls. The air ejection system includes a plow assembly 92 which is mounted to extend along the drive chain 14 within the gate, and which is configured to be received between the depending legs of the advancing folded products. The plow assembly 92 is composed of a pair of separate plows 93, 94, which are of mirror image configuration, and which are secured on respective opposite sides of the guide rail 15 and the upper run of the conveyor, note FIGS. 8 and 11. Also, a shim 95 is positioned below the guide rail 15 and between the two plows 93, 94.

Each plow 93, 94 includes a pointed forward nose section 97, 98, such that the two nose sections act to open the depending legs of each folded products as it approaches the rejecting gate.

The medial portion of each plow 93, 94 includes a plurality of upwardly directed upper openings 100 disposed in spaced relation along the length of the medial portion. An internal manifold 102 is positioned within the medial portion of each plow, and the manifold 102 communicates with each of the associated upper openings 100. Also, a set of lower openings 103 extends upwardly from the bottom of each medial portion, and each lower opening communicates with the manifold 102. The lower openings 103 are respectively aligned in the vertical direction with the upper openings 100.

A manifold box 105 is mounted on the main frame 32, and an air line 106 extends between the manifold box and each of the lower openings of the two plows. More particularly, the manifold box 105 includes two rows of connectors 107 for the air lines 106, with one row connected to the lines leading to one of the plows and the second row connected to the lines leading to the other plow. The interior of the manifold box houses a deflector or baffle 108, which serves to divide the flow entering from an end inlet 110 into two uniform flows leading to the two rows of connectors. The end inlet 110 of the box 105 in turn is connected to a solenoid operated valve 112, and then to an air supply via a manually operated valve 114.

The side of the main frame 32 opposite the frame subassembly mounts a side cover plate 115, which secures and supports the three upright mounting plates 80. The side cover plate 115 also mounts a top exit plate 117, and it also supports the bottom plate 118 and opposite side plate 120 of a reject receptacle.

The forward end of the rejecting gate further includes a pair of flared guide plates 122, 123 extending forwardly on opposite sides of the drive chain conveyor for retaining and preventing the outward flaring of the depending legs of the folded printed products as they pass through the gate. Also, a guide plate 124, 125 is mounted to depend from each of the plows, note FIG. 8, so as to prevent the inward movement of the legs of the advancing products. Finally, a product guide 127 is positioned along one side of the drive chain conveyor adjacent the forward end of the gate.

As noted above, the rejecting gate 30 also includes a detector 65 which is designed to detect a product which has jammed or wedged in the gate. Such a jam is illustrated in FIG. 14. The detector 65 typically comprises a light source and a reflective mirror, and the detector is connected to the computer control 26 as schematically indicated in FIG. 1, so as to signal the computer control 26 whenever the light beam is broken for longer than a predetermined time, and which indicates that a product has jammed in the gate.

Upon exiting the product rejection gate, the drive chain conveyor 10 and the conveyed products 20 pass through a conventional stitcher 130, such as a saddle stitcher, and then to a conventional trimmer 132. From the trimmer, the conveyed products continue to further book or magazine processing areas, such as inspection and packaging areas.

In operation, the chain drive conveyor 10 is advanced by the chain drive 12, and the upper run of the conveyor receives folded sheets or signatures at each of the signature feeders 22, so as to form a series of advancing folded printed products 20 in which a number of signatures overlie each other. The products 20 serially pass by the detector 25 which checks for the absence of a product, or other product parameter, and then to the caliper 24 which checks the thickness of each product. The detector 25 and the caliper 24 are each connected to the computer control 26 which operatively controls the air valve 112 and the motor 38, such that upon a product having been identified by the detector 25 or caliper 24 as being defective, it may be removed from the conveyor.

The removal of the defective product from the conveyor is controlled by the computer control 26, which commences the operation of the motor 38 so as to rotate the ejector rolls when the defective product approaches the gate 30. The air ejector system is then actuated by the opening of the valve 112 when the defective product reaches the medial portion of the plow assembly. The defective product is thereby lifted from the conveyor and into the nip of the rotating ejector rolls, as shown in FIG. 12. The leading edge of the ejected product then engages the arcuate guide plate 72 which serves to deflect the product laterally over the top exit plate 117 and into the reject receptacle formed by the plates 115, 118, and 120. The computer control 26 then terminates the rotation of the rolls and the air ejection system.

The orientation of the ejector rolls is such that the rolls not only lift the defective product, but they also impart a force component in the direction of the advance of the conveyor. Thus slippage between the rolls and the products is minimized. Typically, the rolls are each oriented so as to rotated about an axis which is inclined upwardly at an angle of about 30° with respect to the horizontal upper run of the conveyor, and the rolls have a surface speed which is at least about 1.6 times the speed of the advance of the upper run.

In the event a product should jam or wedge in the nip, the detector 65 will signal the computer control 26 to open the valve 60 and thereby open the frame subassembly 46 to the position shown in FIG. 14. The computer control also can be programmed to concurrently shut down the chain drive 12 and the other components of the conveyor 10, such as the stitcher 130, upon receipt of a signal from the detector 65. The operator can manually perform this function by closing the switch 66. Once the frame subassembly 46 has been opened, and the advance of the conveyor has stopped, the operator can lift the cover plate 70 to the position shown in dashed lines in FIG. 14, and reach into the gate to clear the jammed product.

In the drawings and specification, there has been set forth a preferred embodiment of the invention, and although specific terms are employed, they are used in a generic and descriptive sense only and not for purposes of limitation.

That which is claimed is:

1. An apparatus for conveying folded printed products serially along a path of travel, comprising:

an endless product gathering conveyor having an upper run which extends along the path of travel, a drive for advancing the upper run of the conveyor along the path of travel, feed means for serially feeding folded printed sheets in a straddling relation onto the upper run of the advancing conveyor so as to form a series of advancing folded printed products each composed of a plurality of the sheets and with the folded printed products being spaced apart along the upper run of the conveyor, at least one product monitor positioned along the path of travel for monitoring one or more parameters of each printed product as it advances thereby and generating a control signal whenever a monitored parameter does not meet a predetermined standard, a product rejecting gate positioned along the path of travel downstream of the product monitor and comprising;
   a) at least one mating pair of ejector rolls positioned to form a nip disposed above the upper run of the conveyor,
   b) a roll drive for rotating the pair of ejector rolls so that at the nip the rolls move away from the upper run, and
   c) an air ejection system for lifting a folded printed product from the upper run of the conveyor and into the nip in response to a control signal from said product monitor indicating that such product does not meet the predetermined standard, and so that the ejector rolls engage the lifted product and carry the same to a reject receptacle, said air ejection system including a plow assembly extending along the upper run of the conveyor, with the plow assembly including a plurality of upwardly directed openings spaced along at least a portion of its length, and air supply means for selectively delivering pressurized air to said openings.

2. The apparatus as defined in claim 3 wherein the rolls of each mating pair of rolls are radially resilient such that the outer peripheries of the mating rolls may be flattened at the nip formed therebetween.

3. The apparatus as defined in claim 1 wherein the one mating pair of ejector rolls is mounted for rotation about respective parallel axes which are each parallel to the upper run of the conveyor when viewed from above the path of travel and inclined with respect to the upper run when viewed from one side of the upper run, and so that at the nip, the rotating rolls have a component of movement perpendicular to the upper run of the conveyor and a component of movement parallel to the direction of movement of the upper run of the conveyor.

4. The apparatus as defined in claim 3 further comprising a computer control for actuating the roll drive for the ejector rolls and actuating said air ejection system in response to a control signal from said product monitor, with the actuation of the roll drive and the actuation of said air ejection system being timed to eject a folded printed product which was identified by said product monitor as not meeting a predetermined standard.

5. The apparatus as defined in claim 3 wherein the folded printed products each include a fold line, and a pair of legs depending from the fold line, and wherein the plow assembly is configured to be received between the depending legs of the advancing folded printed products.

6. The apparatus as defined in claim 3 wherein the parallel axes of the one mating pair of ejector rolls are each inclined at an angle of about 30° with respect to the upper run of the conveyor when viewed from one side of the upper run.

7. The apparatus as defined in claim 6 wherein the product rejecting gate comprises a plurality of mating pairs of ejector rolls, with one roll of each mating pair being positioned on one side of the upper run when viewed from above, with the other roll of each mating pair being positioned on the other side of the upper run when viewed from above.

8. The apparatus as defined in claim 7 wherein the rolls which are mounted on said one side of the upper run are mounted for rotation about fixed parallel axes, and the rolls which are mounted on the other side of the upper run are mounted for rotation about axes which are movable in unison in a lateral direction and between a closed position wherein the mating rolls of each pair engage each other and an open position wherein the mating rolls of each pair are laterally separated.

9. The apparatus as defined in claim 8 wherein the product rejecting gate further comprises a detector for detecting a jam of a printed product at the product rejecting gate, and means for moving the rolls to said open position upon a jam being detected by said detector.

10. The apparatus as defined in claim 1 wherein said plow assembly comprises a pair of plows positioned on respective opposite sides of the upper run of the conveyor, with each of the plows including a plurality of said upwardly directed openings, such that the air delivered by said air supply means moves upwardly along each side of said upper run of said conveyor.

11. The apparatus as defined in claim 10 wherein said air supply means includes an internal manifold in each of said plows which communicates with each of the associated upwardly directed openings.

12. The apparatus as defined in claim 11 wherein said air supply means further comprises at least one pair of air delivery lines communicating with respective ones of said manifolds, with each of said one pair of air delivery lines being connected to a manifold box, and an air valve connected between an air supply and said manifold box so that when said air valve is opened air is delivered to the manifold box and then to the upwardly directed openings via the manifold box and the air delivery lines.

13. An apparatus for rejecting a defective folded printed product from a line of such products as they are serially conveyed in a straddling relation on an upper run of a gathering conveyor, said apparatus comprising
   a) at least one mating pair of ejector rolls positioned to form a nip disposed above the upper run of the conveyor,
   b) a roll drive for rotating the pair of ejector rolls so that at the nip the rolls move away from the upper run, and
   c) an air ejection system for lifting a folded printed product from the upper run of the conveyor and into the nip in response to a control signal indicating that such product does not meet a predetermined standard, and so that the ejector rolls engage the lifted product and carry the same to reject receptacle, said air ejection system including a plow assembly extending along the upper run of the conveyor, with the plow assembly including a plurality of upwardly directed openings spaced along at least a portion of its length, and air supply means for selectively delivering pressurized air to said openings.

14. The apparatus as defined in claim 13 wherein the folded printed products each include a fold line, and a pair of legs depending from the fold line, and wherein the plow assembly is configured to be received between the depending legs of the advancing folded printed products.

15. The apparatus as defined in claim 13 wherein the one mating pair of ejector rolls is mounted for rotation about respective parallel axes which are each parallel to the gathering conveyor when viewed from above and inclined with respect to the gathering conveyor when viewed from one side of the gathering conveyor, and so that at the nip, the rotating rolls have an upward component of movement which is perpendicular to the gathering conveyor and a component of movement parallel to the direction of the gathering conveyor.

16. The apparatus as defined in claim 15 wherein the product rejecting gate comprises a plurality of mating pairs of ejector rolls, with one roll of each mating pair being positioned on one side of the gathering conveyor when viewed from above, with the other roll of each mating pair being positioned on the other side of the gathering conveyor when viewed from above.

17. The apparatus as defined in claim 16 wherein the rolls which are mounted on said one side of the gathering conveyor are mounted for rotation about fixed parallel axes, and the rolls which are mounted on the other side of the gathering conveyor are mounted for rotation about axes which are movable in unison in a lateral direction and between a closed position wherein the mating rolls of each pair engage each other and an open position wherein the mating rolls of each pair are laterally separated.

18. The apparatus as defined in claim 17 wherein the product rejecting gate further comprises a detector for detecting a jam of a printed product at the product rejecting gate, and means for moving the rolls to said open position upon a jam being detected by said detector.

* * * * *